United States Patent [19]
Tu et al.

[11] Patent Number: 5,774,426
[45] Date of Patent: Jun. 30, 1998

[54] METHOD AND DEVICE FOR FEEDING A SINGLE-PHASE STEPPING MOTOR

[75] Inventors: Mai Xuan Tu, Ecublens; Michel Schwab, Bienne, both of Switzerland

[73] Assignee: Detra SA, Bienne, Switzerland

[21] Appl. No.: 790,018

[22] Filed: Jan. 28, 1997

[30] Foreign Application Priority Data

Feb. 13, 1996 [EP] European Pat. Off. .............. 96810084

[51] Int. Cl.⁶ ................................ G06F 1/04; H02P 1/40
[52] U.S. Cl. .......................................... 368/157; 318/696
[58] Field of Search .......................... 368/76, 80, 86–87, 368/157, 160; 318/135, 685, 690

[56] References Cited

U.S. PATENT DOCUMENTS

| | | |
|---|---|---|
| 4,346,463 | 8/1982 | Tu Xuan et al. . |
| 4,542,329 | 9/1985 | Tu Xuan . |
| 5,038,329 | 8/1991 | Kawamura ............................ 368/157 |
| 5,195,063 | 3/1993 | Moriya .................................... 368/157 |
| 5,247,235 | 9/1993 | Tu et al. . |

FOREIGN PATENT DOCUMENTS

| | | |
|---|---|---|
| A-0097350 | 1/1984 | European Pat. Off. . |
| A-0345224 | 12/1989 | European Pat. Off. . |
| A-0443294 | 8/1991 | European Pat. Off. . |
| A-0672975 | 9/1995 | European Pat. Off. . |

Primary Examiner—Vit W. Miska
Attorney, Agent, or Firm—Oliff & Berridge, PLC

[57] ABSTRACT

The method and the device for feeding a single-phase stepping motor for a timepiece are adapted to provide the motor (M) with a sequence of chopped voltage pulses of variable duration as a function of load conditions and of feed voltage. The sequence of chopped voltage pulses comprises in particular a supplementary sequence of partial voltage pulses of constant duration ($T_4$), separated from each other by variable intervals ($T_{5i}$) defined by a reference current ($I_{ref}$) whose value is adapted as a function of the level of load of the motor.

11 Claims, 10 Drawing Sheets

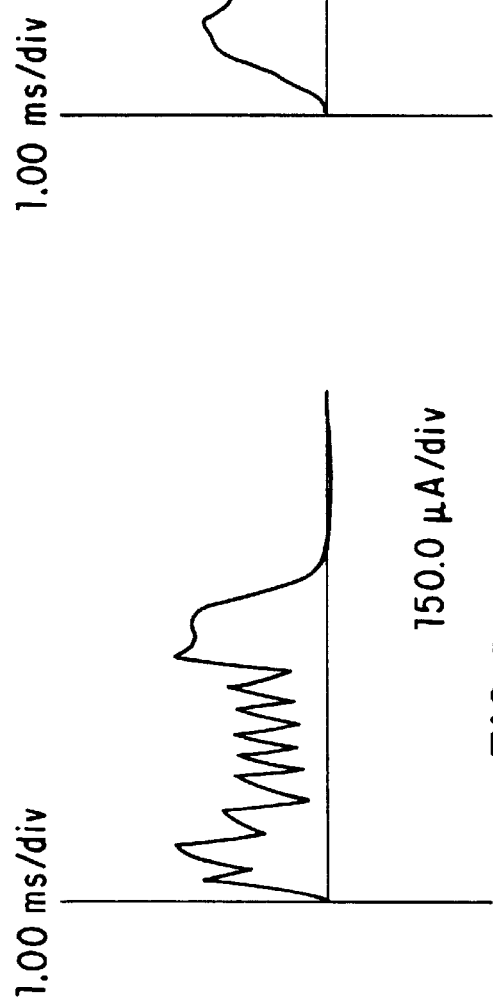
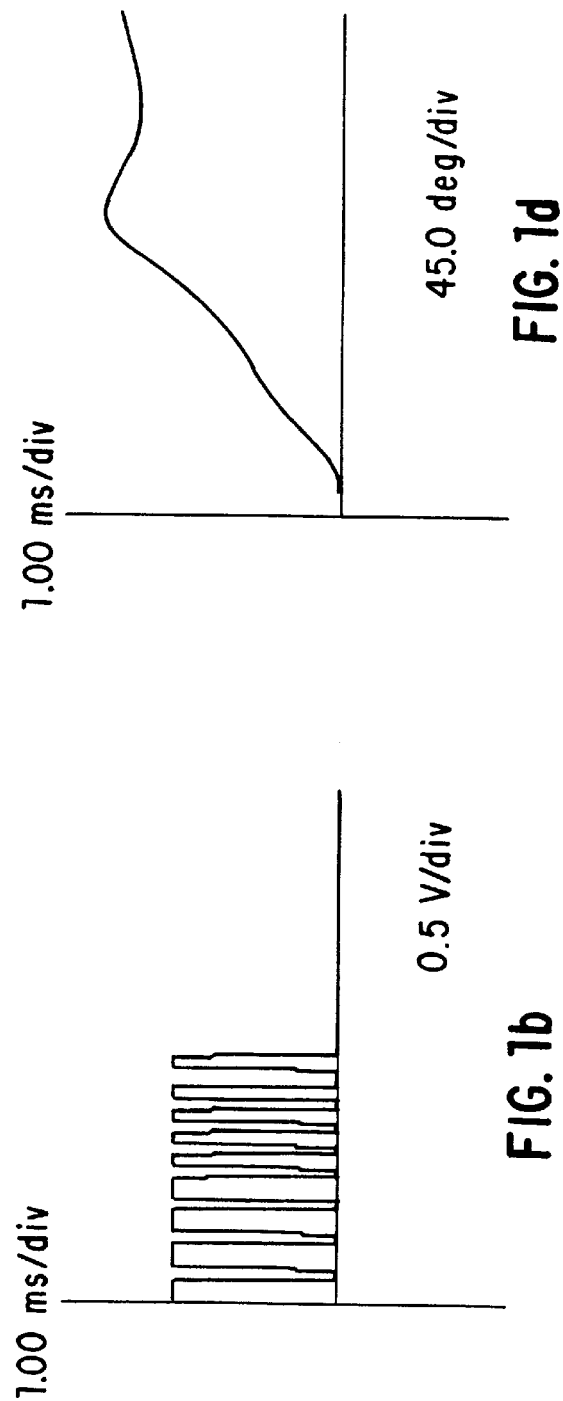
FIG. 1a
FIG. 1b
FIG. 1c
FIG. 1d

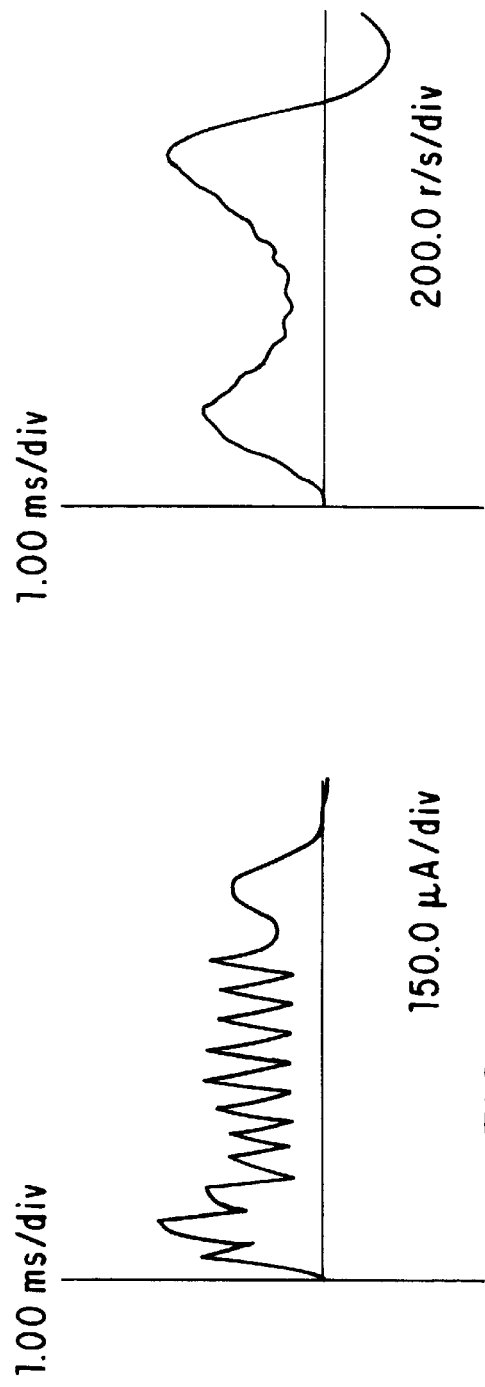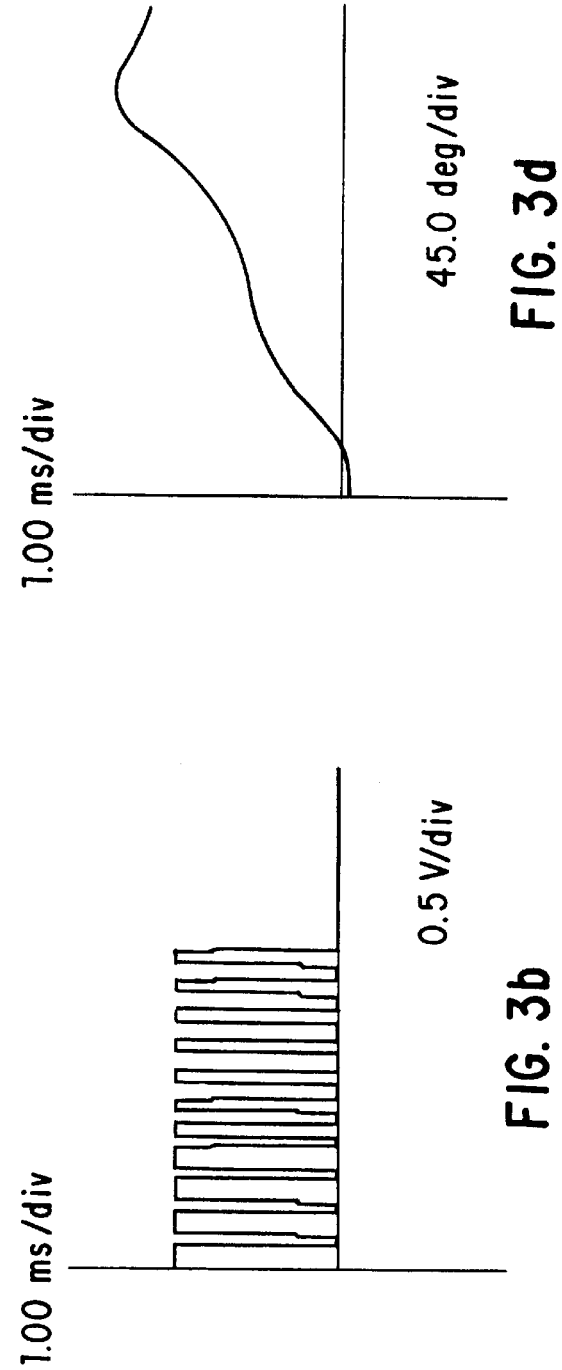

METHOD AND DEVICE FOR FEEDING A SINGLE-PHASE STEPPING MOTOR

This invention has as its subject matter a method of feeding a stepping motor for a timepiece as well as a device for implementing said method. The contents of European patent application No. 96810084.2, filed on Feb. 13, 1996, is hereby incorporated by reference.

A stepping motor used in timepieces generally operates with an extremely small load, except in certain special cases such as, for example, during jolts or during calendar changes. Thus, in order to save the energy supplied by the battery, it is advantageous to feed the motor with a pulse adapted according to the load.

Several types of adapted feed have been proposed such as, for example, that described in U.S. Pat. No. 4,346,463.

These feeds have the drawback that their implementation is complex enough to increase the price of the circuit.

Proposed in U.S. Pat. No. 5,247,235 is a method of supplying power to a single-phase stepping motor with a simplicity of implementation of the logical control circuit. However, this method has two major drawbacks, namely:

For the method to function correctly, the reference current $I_{ref}$ must be sufficiently precise in a sufficiently wide voltage and temperature range. Even through this precision can be achieved technically, it nevertheless means an increase in price of the circuit.

If the reference current level is set high enough, the gain in energy consumption is low. On the other hand, if the reference current level is low, the torque developed by the motor is limited, which can lead to missed steps during severe jolts.

U.S. Pat. No. 4,542,329 describes a method of feeding a stepping motor in which the supply of power to the coil takes place during a first period by means of chopped pulses whose cyclical ratio is constant. Consequently the motor is fed by a current varying only little between two fixed limits. These two features do not permit as great an energy savings as that obtained by the method according to the invention.

The object of the present invention is to propose solutions allowing the aforementioned drawbacks to be overcome while maintaining the same advantages of simplicity of method described in U.S. Pat. No. 5,247,235.

This object is achieved by means of a method of feeding a single-phase stepping motor (M) for a timepiece, adapted to supply the motor with a sequence of chopped voltage pulses of total duration $T_6$, variable as a function of load conditions and as a function of the feed voltage, wherein said sequence of pulses of total duration $T_6$ is made up of a first sequence, of total duration $T_1$, of chopped pulses during which the cyclical ratio of said pulses is constant and of a second sequence of partial voltage pulses, each being of constant duration $T_4$ and of the same polarity as the pulses of the first sequence of total duration $T_1$, separated from each other by time intervals $T_{5i}$ during which the coil of the motor is short-circuited, the first time interval $T_{5i}$ being delimited by the end of the first sequence of pulses of total duration $T_1$ and by the instant following that end when the current of the coil is smaller or equal to a reference value $I_{ref}$, the other time intervals $T_{5i}$ being delimited by the end of a said pulse of duration $T_4$ and by the instant following that end when the current of the coil is smaller or equal to the reference value $I_{ref}$, the said reference value $I_{ref}$ and said cyclical ratio of pulses of the first sequence of total duration $T_1$ being adapted as a function of the level of load of the motor.

The object is also achieved by means of a feed device for a single-phase stepping motor (M) for implementing the method according to one of the preceding claims, comprising a set of circuit breakers, time counting means determining main periods $T_0$ following one another with a constant frequency, control means acting upon the circuit breakers to supply the motor (M) during each main period with a sequence of chopped pulses made up of a plurality of partial pulses and means of comparison responding to durations $T_6$, $T_{d1}$ and $T_{d2}$, wherein the counting means are designed to define the partial durations $T_4$ and the duration $T_1$, and include a detector reacting to the level of current of the motor (M) with respect to the reference value $I_{ref}$ to delimit the variable time limits $T_{5i}$, and wherein the means of comparison are designed to determine the cyclical ratio of the sequence of pulses of total duration $T_1$ and the value of the reference current $I_{ref}$. A further object of the invention is a timepiece having said feed device.

The invention will be better understood upon reading the following description, reference being made the accompanying drawings, in which:

FIGS. 1a, 1b, 1c and 1d show, respectively, as a function of time, the current, the voltage, the angular velocity and the angle of rotation of the rotor of a stepping motor fed according to the method of the present invention, the motor not being under load;

Figure 4A:
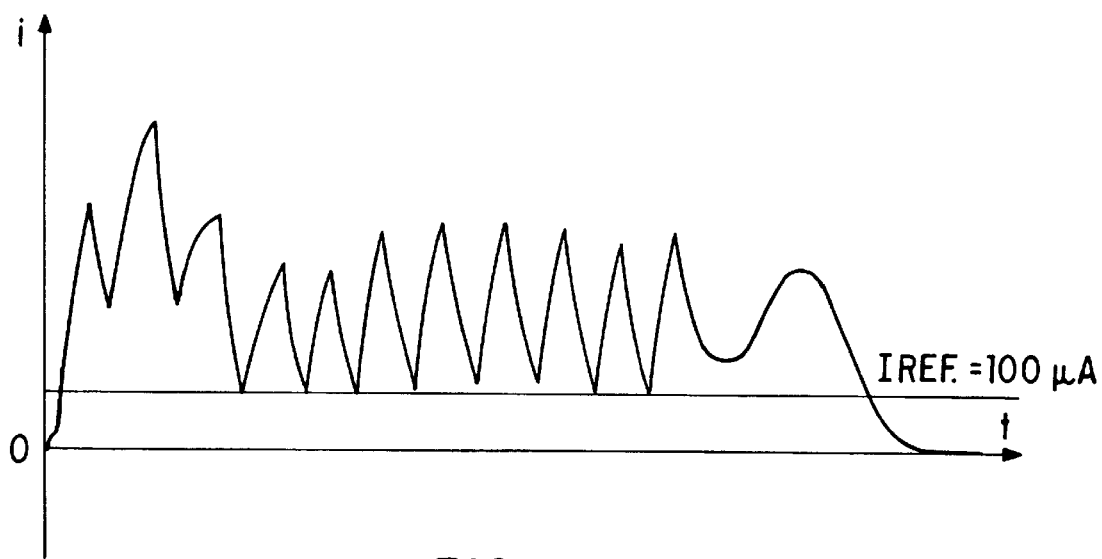
Figure 4B:
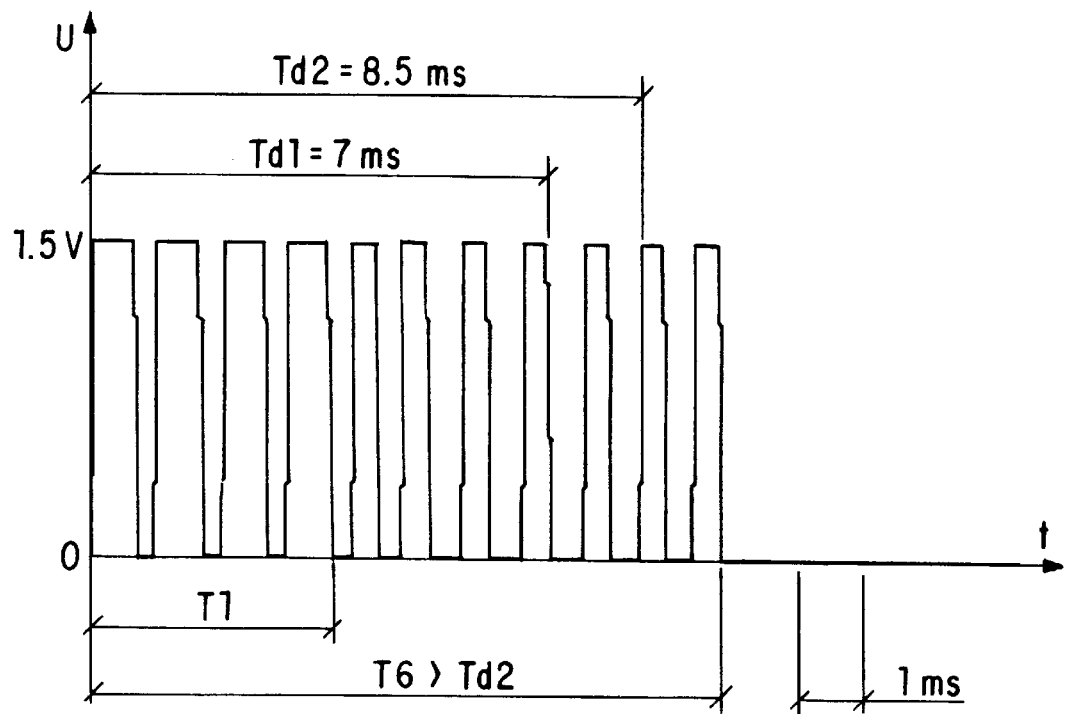
Figure 5A:
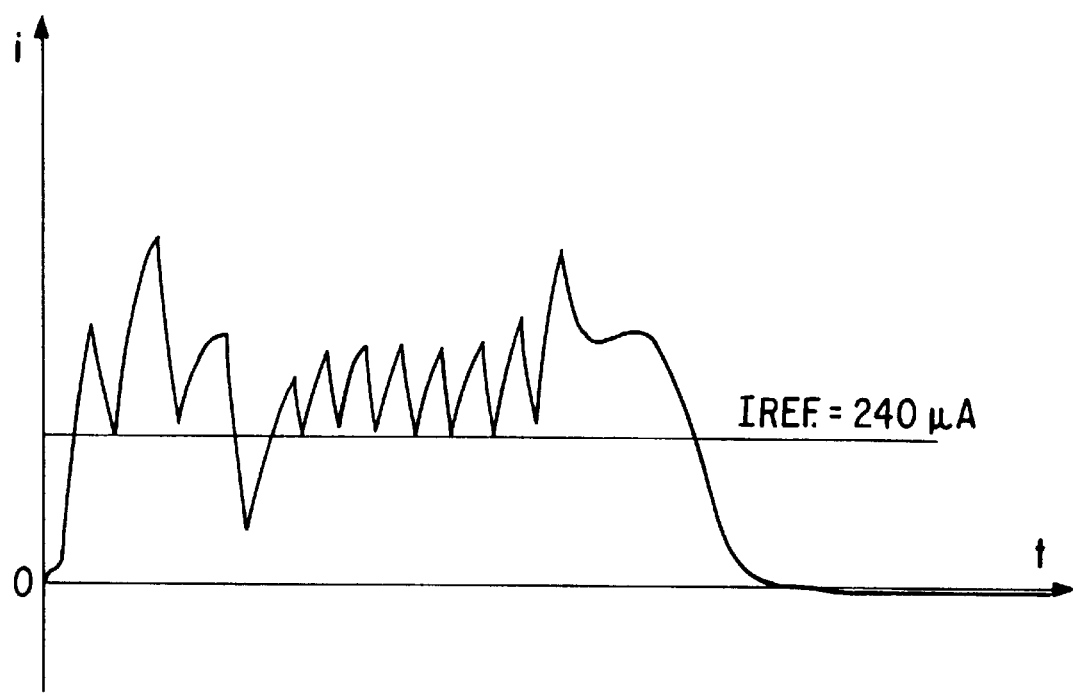
Figure 5B:
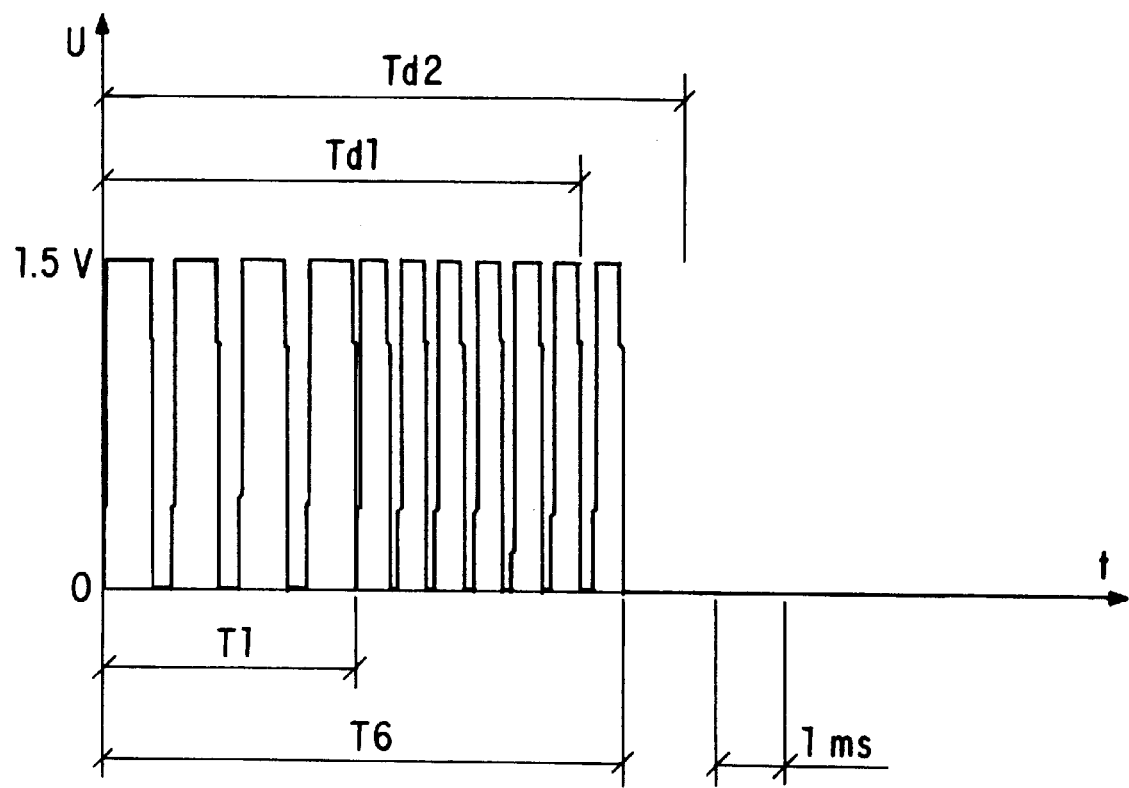
Figure 6A:
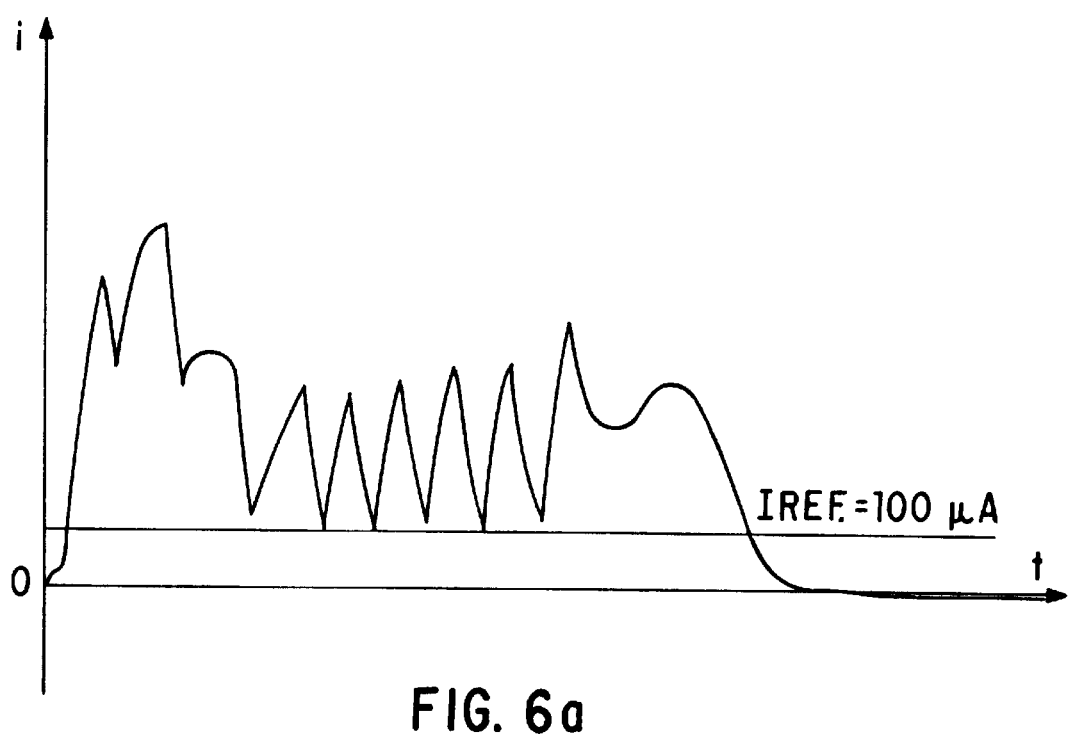
Figure 6B:
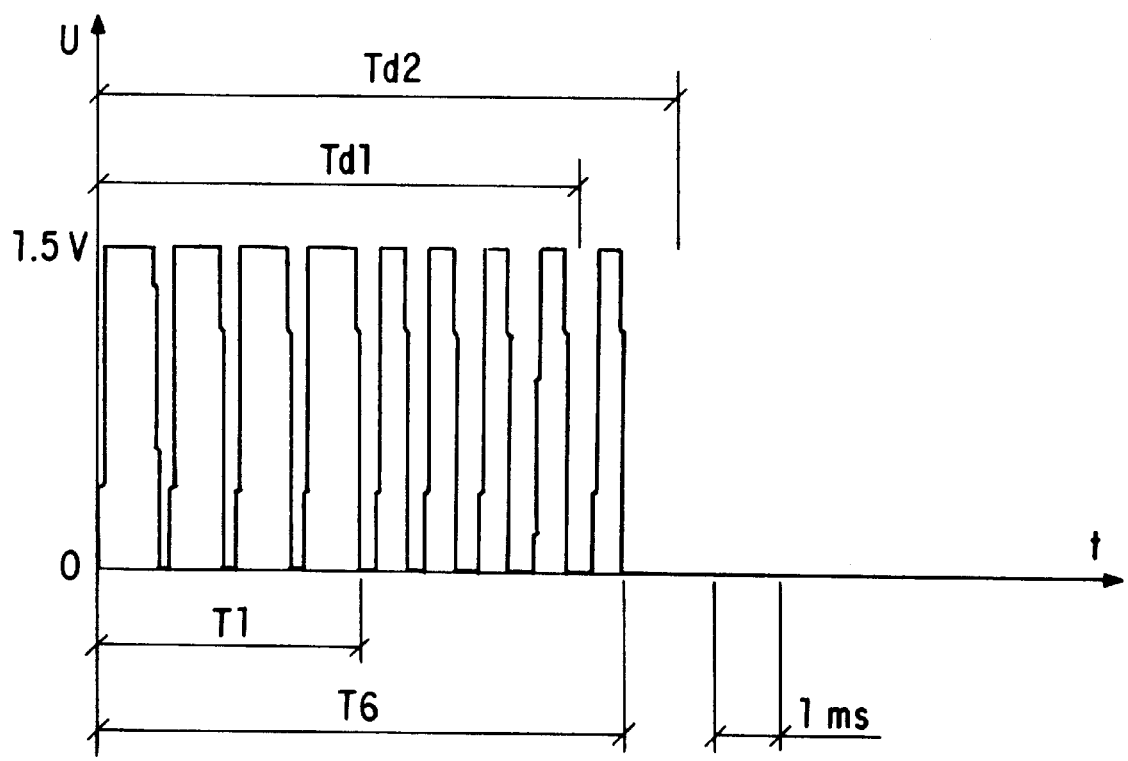
Figure 7A:
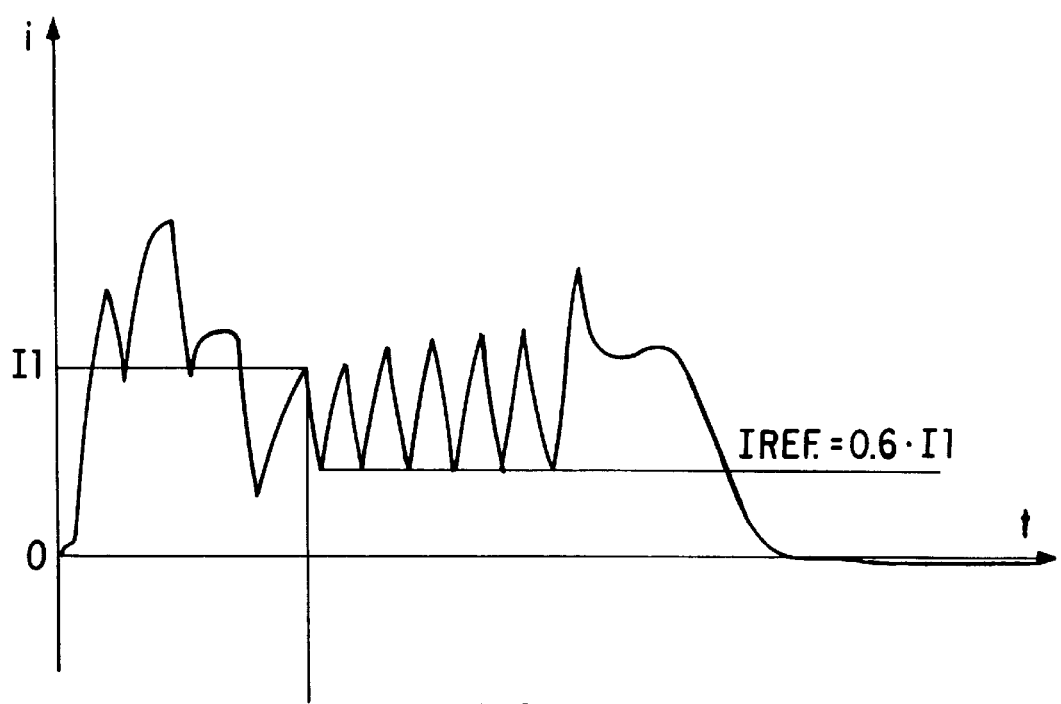
Figure 7B:
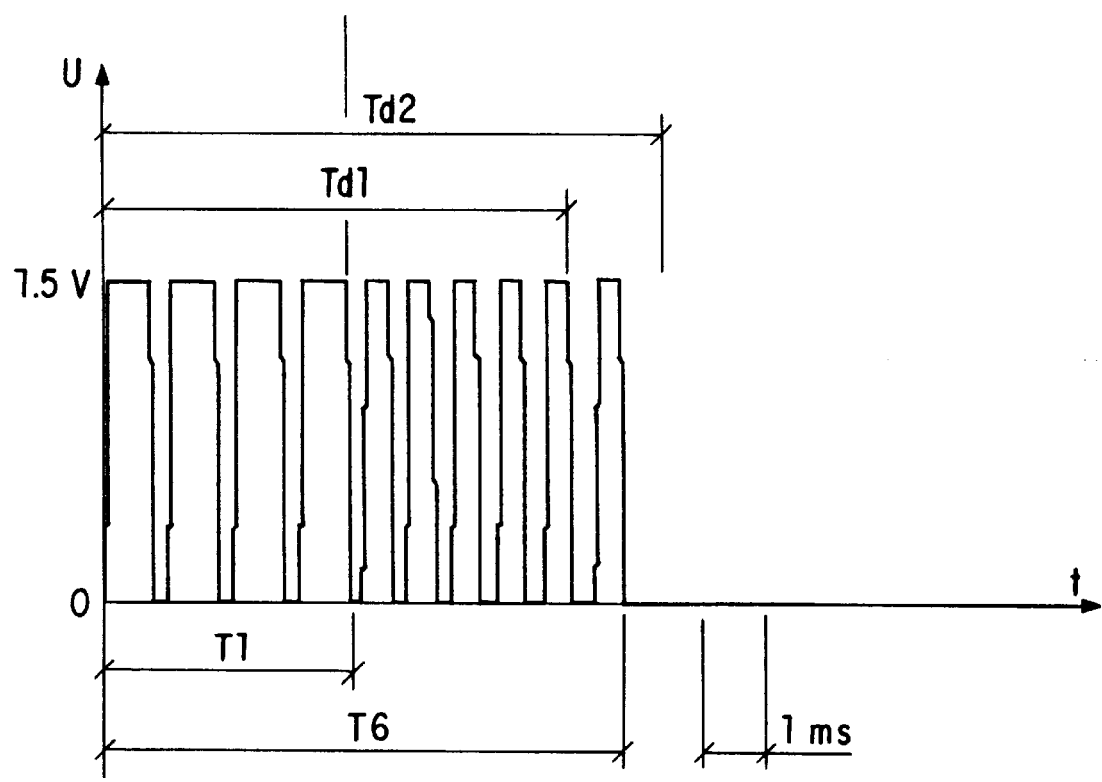
Figure 8A:
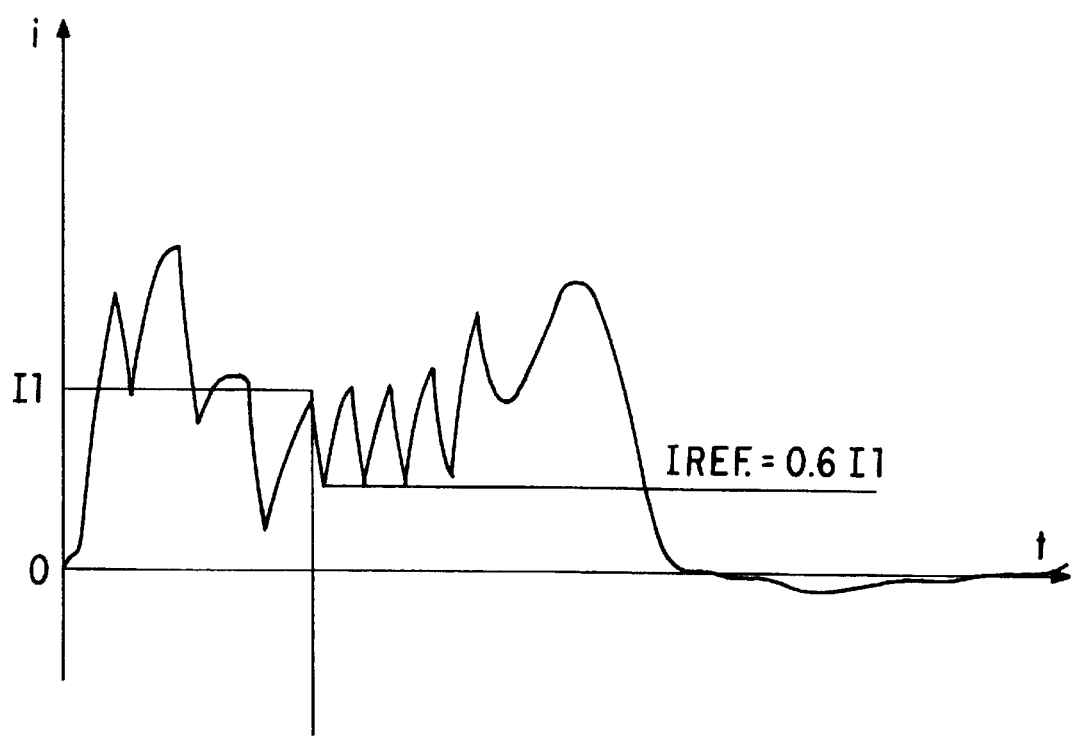
Figure 8B:
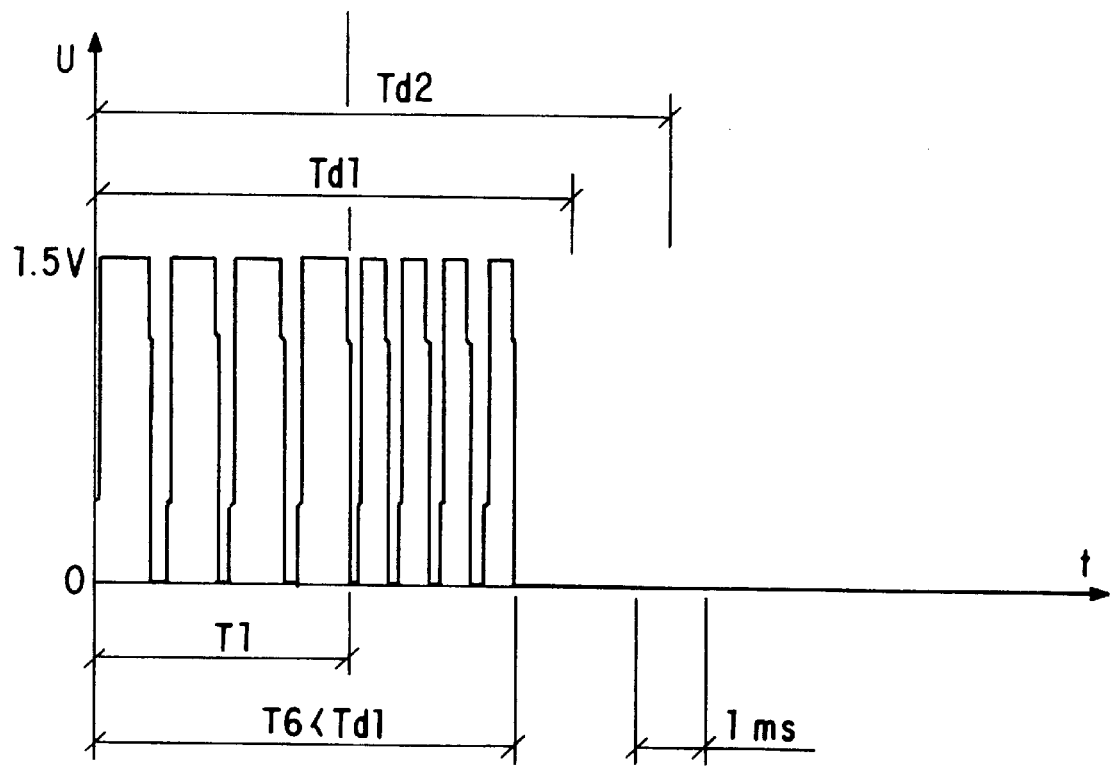
Figure 9:
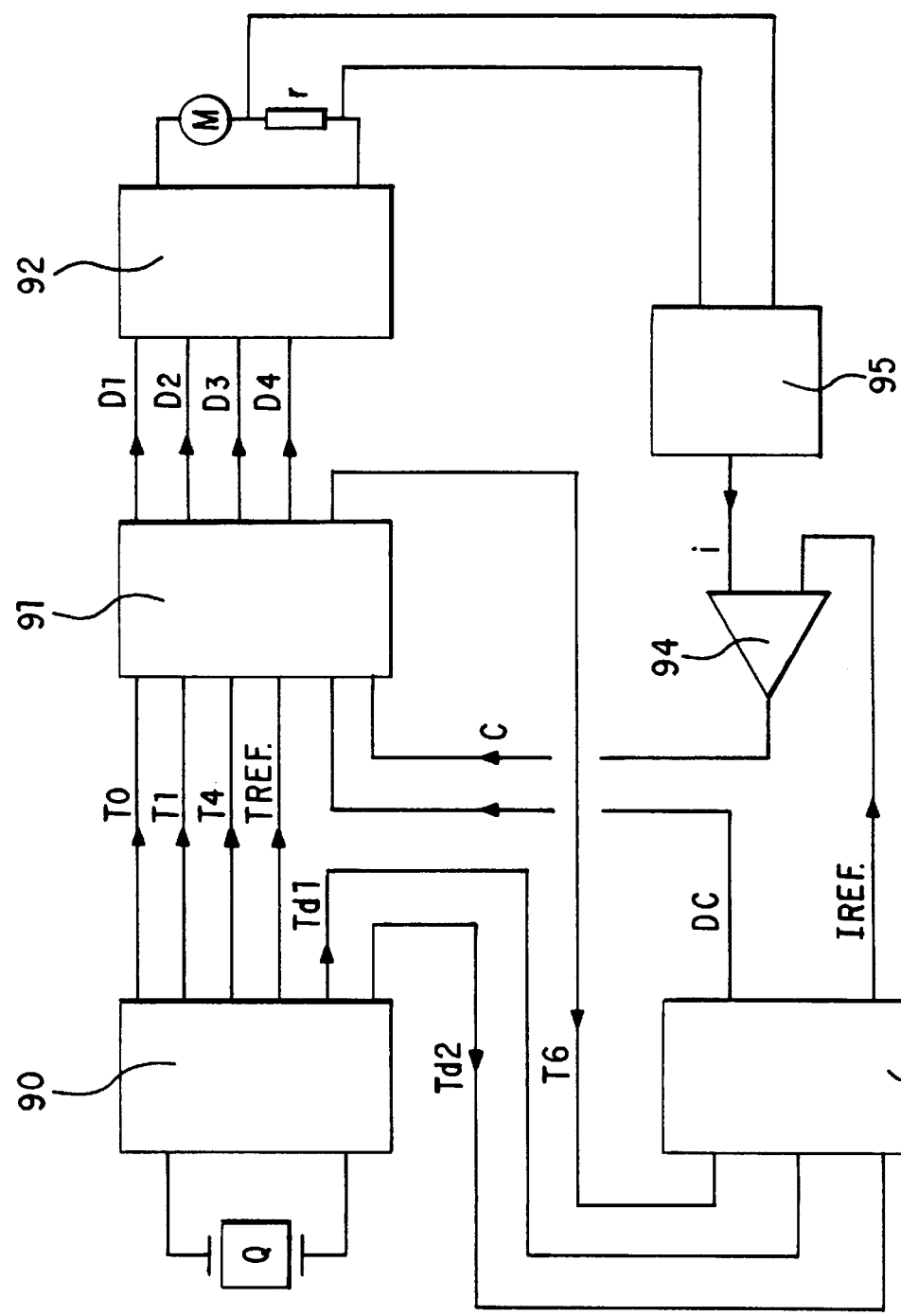
Figure 10:
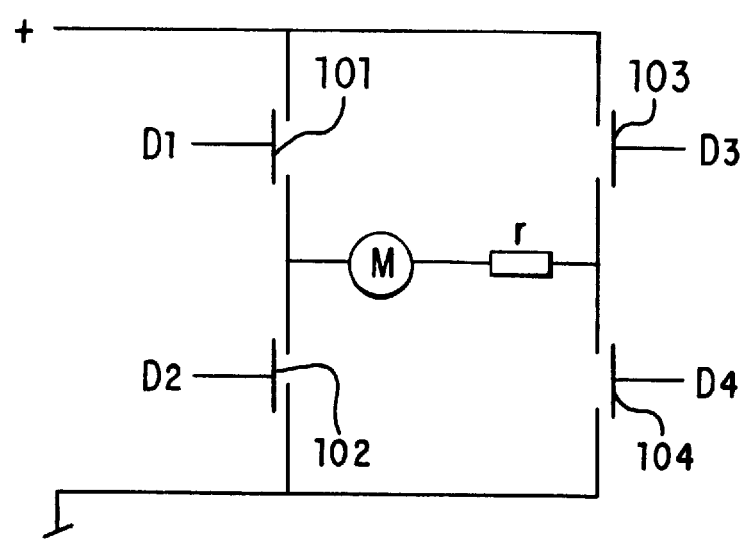

FIGS. 3a, 3b 3c and 3d show, as function of time, the current, the voltage, the angular velocity, angle of rotation of the motor under the same feed conditions as those of FIGS. 1a, 1b, 1c, 1d, the motor being under a mechanical torque load;

FIGS. 4a and 4b are enlargements of FIGS. 3a and 3b;

FIGS. 5a and 5b show the current and the voltage of the motor, under load, with an increase in the level of the reference current;

FIGS. 6a and 6b show the current and the voltage of the motor, under load, with an increase of cyclical ratio of pulse $T_1$;

FIGS. 7a and 7b show the current and the voltage of the motor, under load, with a simultaneous change of reference current and of cyclical ratio of pulse $T_1$;

FIGS. 8a and 8b show the current and the voltage of the motor under the same feed conditions as those of FIGS. 7a and 7b, the motor idling;

FIG. 9 is a block diagram of an example embodiment of a device for implementing the feeding method according to the invention;

FIG. 10 shows block 92 of FIG. 9 in detail.

FIGS. 1a, 1b, 1c and 1d show, respectively, as a function of time, the current, the voltage, the angular velocity and angle of rotation of the rotor of a single-phase stepping motor fed according to the method of the present invention, the motor idling, i.e. without mechanical torque. In this case, the angular velocity of the motor is increased (close to 800 rad/sec) and the motor makes its step of 0 to 180 degrees after about 8 ms.

Figure 2A:
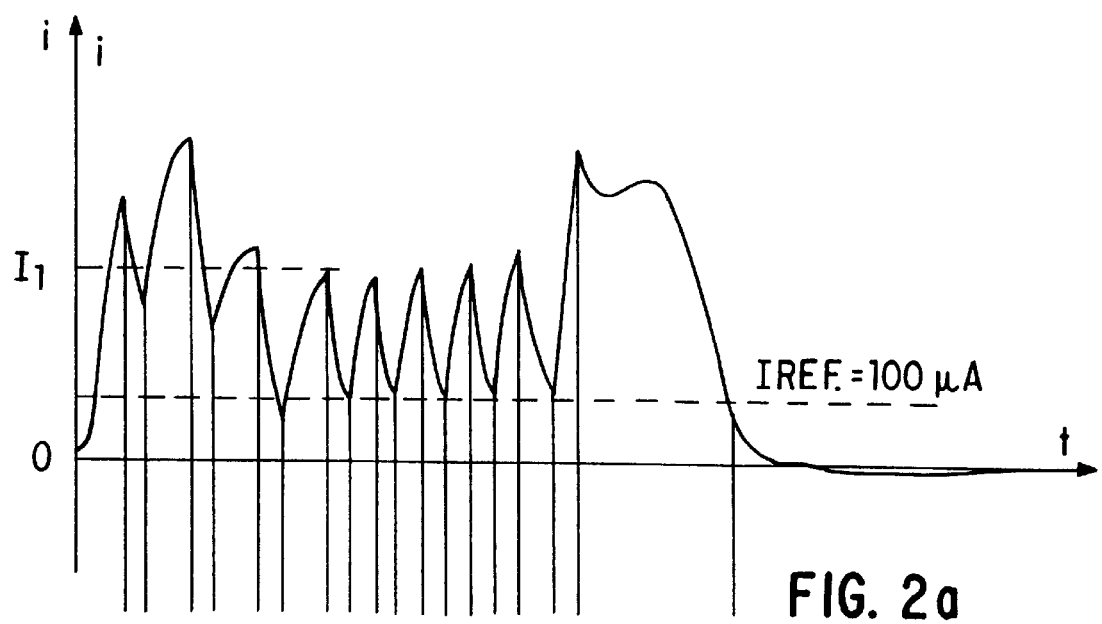
FIGS. 2a and 2b are enlargements from FIGS. 1a and 1b.
Figure 2B:
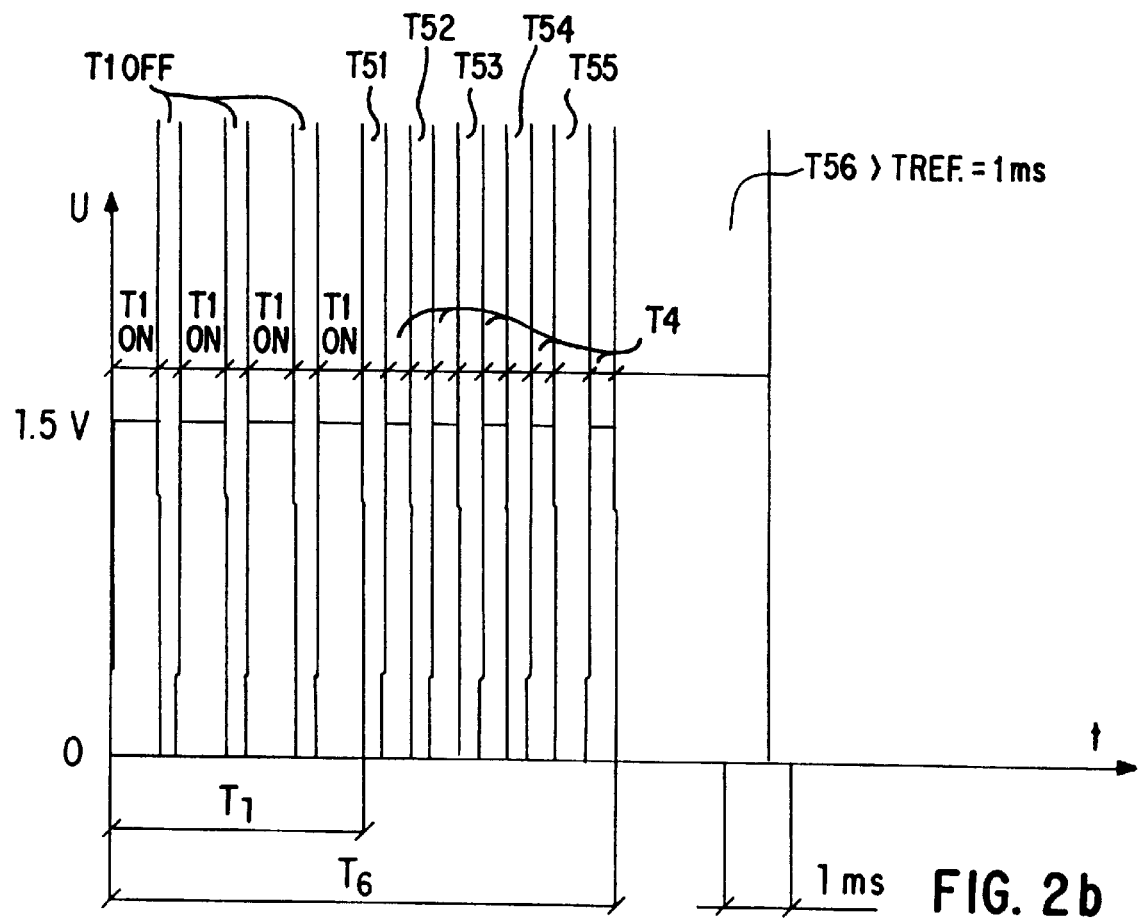

FIGS. 2a and 2b are enlargements from FIGS. 1a and 1b.

The sequence of chopped voltage pulses of duration $T_6$ is made up of a first sequence of chopped voltage pulses of constant duration $T_1$, defined by periods $T_{1on}$ during which the coil of the motor is fed with a voltage of 1.5 volt and of periods $T_{1off}$ during which the coil of the motor is short-circuited, followed by another sequence of partial pulses of constant duration $T_4$, separated from one another by variable intervals $T_{5i}$ (with i=1 to 6).

In the example:

$T_1$=3.7 ms $T_{1on}$=0.7 ms $T_{1off}=0.3$ ms $T_4=0.4$ ms

The sequence of partial pulses $T_4$ is achieved in the following way: at the end of the sequence of chopped pulses of duration $T_1$, the current of the motor being equal to $I_1$, the coil of the motor is short-circuited. The current decreases from the value $I_1$ to a reference value equal, for example, to 100 µA. Starting from that instant, that is to say the instant $t=T_1+T_{51}$, the coil is to be fed again with a voltage of 1.5 volt for duration $T_4$.

After this duration, that is to say the instant $t=T_1+T_{51}+T_4$, the coil of the motor is short-circuited until the moment when the current of the motor is less or equal to $I_{ref}$ and so on.

The feeding process is interrupted when one of the following conditions arises:

The number of partial pulses of duration $T_4$ has reached a limit; in this example the limit set at 15 has not been reached.

The total duration $T_6$ of the pulse surpasses a value limit. In this example, this limit set at 15 ms has not been reached.

One of the time intervals $T_{5i}$ exceeds a value limit. In this case, this limit $T_{ref}$ set at 1 ms is reached at time $t=7.5$ ms.

In this case, this limit is reached during the last pulse of current whose shape, different from the preceding ones, results from passage at 180° of the rotor of the stepping motor.

FIGS. 3a, 3b, 3c and 3d show the current, the voltage, the angular velocity and the angle of rotation when the motor is under a mechanical torque load, the feed conditions being identical to those of the preceding example, that is to say:

$T_1=3.7$ ms $T_{1on}=0.7$ ms $T_{1off}=0.3$ ms $T_4=0.4$ ms $I_{ref}=100$ µA

One notes that the speed of the rotor diminishes appreciably with respect to the preceding case and the total duration of the pulse $T_6$ goes from 7.5 ms of the preceding case to about 10 ms.

FIGS. 4a and 4b are enlargements from FIGS. 3a and 3b.

A simple means to be used to detect the level of load of the motor consists in comparing the total duration of the pulse $T_6$ with a predetermined duration of detection $T_{d2}$. The duration $T_{d2}$ is a function of the mechanical time constant of the motor, that is to say its inertia and its nominal torque.

If the total duration $T_6$ is greater than $T_{d2}$, that is to say that the motor is under a large load, the level of energy of the feed pulse must be increased.

FIGS. 5a and 5b show the current and the voltage supplied by means of a first method to increase the level of energy of the feed pulse, consisting in increasing the level of the reference current while keeping the other parameters constant, i.e.:

$T_1=3.7$ ms $T_{1on}=0.7$ ms $T_{1off}=0.3$ ms $T_4=0.4$ ms $I_{ref}=240$ µA

In this case, one notes that the duration of feed, when the motor is under load, is practically equal to that of the example of FIG. 1 when the motor is idling.

A second method of increasing the level of energy of the feed pulse consists in increasing the cyclical ratio of the pulse $T_1$, the cyclical ratio being defined by $$\frac{T_{1on}}{T_{1on}+T_{1off}}$$

FIGS. 6a and 6b illustrate the current and the voltage of the motor, under load, with the following feed conditions:

$T_1=3.7$ ms $T_{1on}=0.8$ ms $T_{1off}=0.2$ ms $T_4=0.4$ ms $I_{ref}=100$ µA

In this case, one notes that the feed duration under load is practically equal to 7.5 ms, as in the preceding case.

A third method of increasing the level of energy of the feed pulse consists in changing simultaneously the cyclical ratio of the pulse $T_1$ and the reference current $I_{ref}$.

FIGS. 7a and 7b represent the current and the voltage supplied by the third method of increasing the energy of the feed pulse. With $I_1$ the current of the motor at the end of the pulse $T_1$, the reference current is fixed equal to $k \cdot I_1$, k being a predetermined constant. Serial investigations on several types of motors have shown that the optimal value of k is between 0.6 and 0.9. In the example shown by the FIGS. 7a and 7b, the fixed parameters are the following:

$T_1=3.7$ ms $T_{1on}=0.75$ ms $T_{1off}=0.25$ ms $T_4=0.4$ ms $k=0.6$

FIGS. 8a and 8b represent the current and the voltage of the fed motor under the same conditions as that of the example given in FIGS. 7a and 7b, except that the motor is idling. In this case, one notes that the total duration of the pulse is reduced to about 6 ms. The reduction of the duration of the pulse of the motor leads to an increase in the consumption of energy owing to the excess of kinetic energy of the rotor. To bring this consumption back to an optimal level, one of the solutions consists in comparing the total duration $T_6$ with a detection duration $T_{d1}$ which is slightly less than the duration $T_{d2}$.

If duration $T_6$ is less than $T_{d1}$, that is to say the residual kinetic energy is too large, the level of energy of the feed pulse must be reduced either by a reduction of the level of the reference current or by a reduction of the cyclical ratio of pulse $T_1$ or otherwise by a combination of these two parameters.

FIG. 9 is a block diagram of an example embodiment of the device for implementing the feed method according to the invention. The signal of the time base, coming from the oscillator Q, is sent to the dividing and shaping circuit 90, at the output of which one obtains the feed period $T_0$ of the motor (corresponding to the duration between two starts of sequences of pulses, generally 1 sec., 30 sec. or 1 min. depending upon the type of timepiece), the duration $T_4$ of partial pulses, the duration $T_1$ of the first chopped pulse, the reference duration $T_{ref}$ as well as the detection duration $T_{d1}$ and $T_{d2}$. The logic circuit 91 receiving at its input the different durations provided by the circuit 90, the DC cyclical ratio provided by the control circuit 93 and the signal C coming from the comparator 94, delivers the control signals D1, D2, D3 and D4 at the output level (driver) 92. A measuring resistor r is series-connected with the motor M at the output of the driver 92 and the measurement unit 95 transforms the voltage at the terminals of the measuring resistor r into a signal i representing the pattern of the current circulating in the motor M and the resistor r before being sent to the comparator 94. The control circuit 93 compares the durations $T_{d1}$ and $T_{d2}$ with the total duration of pulse $T_6$ and delivers at its output the cyclical ratio DC and the value of the reference current $I_{ref}$ adapted to the load of the motor.

FIG. 10 is a detail of driver 92 from the block diagram of FIG. 9, coupled to the motor W and to the resistor r. The output transistors 101, 102, 103, and 104 are bridge-connected in an H-network and are controlled by the signals D1, D2, D3, D4 coming from circuit 91.

What is claimed is:

1. A method of feeding a single-phase stepping motor (M) for a timepiece, adapted to supply the motor with a sequence of chopped voltage pulses of total duration $T_6$, variable as a function of load conditions and as a function of the feed voltage, wherein said sequence of pulses of total duration $T_6$ is made up of a first sequence, of total duration $T_1$, of chopped pulses during which the cyclical ratio of said pulses is constant and of a second sequence of partial voltage pulses, each being of constant duration $T_4$ and of the same polarity as the pulses of the first sequence of total duration $T_1$, separated from each other by time intervals $T_{5i}$ during which the coil of the motor is short-circuited, the first time interval $T_{5i}$ being delimited by the end of the first sequence of pulses of total duration $T_1$ and by the instant following that end when the current of the coil is smaller or equal to a reference value $I_{ref}$, the other time intervals $T_{5i}$ being delimited by the end of a said pulse of duration $T_4$ and by the instant following that end when the current of the coil is smaller or equal to the reference value $I_{ref}$, the said reference value $I_{ref}$ and said cyclical ratio of pulses of the first sequence of total duration $T_1$ being adapted as a function of the level of load of the motor.

2. The method of claim 1, wherein said second sequence of pulses is interrupted if one of said time intervals $T_{5i}$ of this sequence of pulses surpasses a reference value $T_{ref}$.

3. The method of claim 1, wherein said second sequence of pulses is interrupted if the number of partial pulses of duration $T_4$ of this sequence of pulses attains a predetermined maximal value.

4. The method of claim 1, wherein said second sequence of pulses is interrupted if the total duration $T_6$ attains a predetermined maximal duration $T_{max}$.

5. The method of claim 1, wherein the detection of said level of load of the motor is made by comparison of the total duration $T_6$ of the sequence of pulses with two predetermined durations $T_{d1}$ and $T_{d2}$ defined by the relationship:

$$T_1 < T_{d1} < T_{d2} < T_{max}.$$

6. The method of claim 5, wherein the cyclical ratio of the first sequence of pulses of total duration $T_1$ is increased by increments when the total duration $T_6$ of the sequence of pulses is greater than $T_{d2}$ and is decreased by increments when the total duration $T_6$ is less than $T_{d1}$.

7. The method of claim 5, wherein the absolute value of the reference current $I_{ref}$ is increased by increments when the total value $T_6$ of the sequence of pulses is greater than $T_{d2}$ and is decreased by increments when the total duration $T_6$ is less than $T_{d1}$.

8. The method of claim 5, wherein the value of the reference current $I_{ref}$ is fixed equal to $k \cdot I_1$, $I_1$ being the value of the current of the last pulse of said first sequence of pulses of total duration $T_1$ and k being a predetermined constant.

9. The method of claim 1, wherein two successive sequences of chopped pulses of total duration $T_6$ are of the same polarity or of opposite polarity.

10. A feed device for a single-phase stepping motor (M) for implementing the method according to one of the preceding claims, comprising a set of circuit breakers, time counting means determining main periods $T_0$ following one another with a constant frequency, control means acting upon the circuit breakers to supply the motor (M) during each main period with a sequence of chopped pulses made up of a plurality of partial pulses and means of comparison responding to durations $T_6$, $T_{d1}$ and $T_{d2}$, wherein the counting means are designed to define the partial durations $T_4$ and the duration $T_1$, and include a detector reacting to the level of current of the motor (M) with respect to the reference value $I_{ref}$ to delimit the variable time limits $T_{5i}$, and wherein the means of comparison are designed to determine the cyclical ratio of the sequence of pulses of total duration $T_1$ and the value of the reference current $I_{ref}$.

11. A timepiece equipped with a device according to claim 10.

* * * * *